United States Patent
Chen et al.

(10) Patent No.: US 12,166,618 B2
(45) Date of Patent: Dec. 10, 2024

(54) SWITCHING PERIOD SYMBOL LOCATION FOR RECEIVER SWITCHING

(71) Applicant: QUALCOMM Incorporated, San Diego, CA (US)

(72) Inventors: Bo Chen, Beijing (CN); Chenxi Hao, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 18/012,876

(22) PCT Filed: Aug. 27, 2020

(86) PCT No.: PCT/CN2020/111652
§ 371 (c)(1),
(2) Date: Dec. 23, 2022

(87) PCT Pub. No.: WO2022/041029
PCT Pub. Date: Mar. 3, 2022

(65) Prior Publication Data
US 2023/0275797 A1    Aug. 31, 2023

(51) Int. Cl.
*H04L 27/26* (2006.01)
*H04L 5/00* (2006.01)

(52) U.S. Cl.
CPC ........ *H04L 27/2647* (2013.01); *H04L 5/0005* (2013.01); *H04L 5/0053* (2013.01)

(58) Field of Classification Search
CPC .. H04L 27/2647; H04L 5/0005; H04L 5/0053
See application file for complete search history.

(56) References Cited

U.S. PATENT DOCUMENTS

| 9,681,447 B2 | 6/2017 | Tang et al. |
| 2017/0041918 A1* | 2/2017 | Lee ........................ H04W 72/51 |

(Continued)

FOREIGN PATENT DOCUMENTS

| EP | 3139522 A1 * | 3/2017 | ............... H04B 7/26 |
| EP | 3343995 A1 | 7/2018 | |

(Continued)

OTHER PUBLICATIONS

Moderator (Ericsson): "FL Summary #2 for Potential UE Complexity Reduction Features for RedCap", 3GPP TSG-RAN WG1 Meeting #102-e, R1-2007177, e-Meeting, Aug. 17, 2020-Aug. 28, 2020, 88 Pages.

(Continued)

*Primary Examiner* — Freshteh N Aghdam
(74) *Attorney, Agent, or Firm* — Seyfarth Shaw LLP

(57) ABSTRACT

A method of wireless communication by a user equipment (UE) includes receiving, from a base station, a receive chain switching configuration for a multi-carrier environment. The UE also receives a physical downlink control channel (PDCCH) on one or more carriers of the multi-carrier environment with multiple receive chains, in accordance with the receive chain switching configuration. The UE decodes downlink control information (DCI) from the PDCCH for physical downlink shared channel (PDSCH) scheduling across multiple carriers in the multi-carrier environment. The UE performs receive chain switching based on the PDSCH scheduling from the decoded DCI and the receive chain switching configuration.

35 Claims, 9 Drawing Sheets

(56) References Cited

U.S. PATENT DOCUMENTS

| | | | |
|---|---|---|---|
| 2017/0302419 A1 | 10/2017 | Liu et al. | |
| 2019/0215847 A1* | 7/2019 | Abdoli | H04W 72/0453 |
| 2020/0162229 A1 | 5/2020 | Chang et al. | |
| 2020/0178134 A1* | 6/2020 | Yang | H04W 36/00838 |
| 2021/0306916 A1* | 9/2021 | Bae | H04L 5/001 |

FOREIGN PATENT DOCUMENTS

| | | | |
|---|---|---|---|
| WO | 2015175136 A1 | 11/2015 | |
| WO | 2021041833 A1 | 3/2021 | |

OTHER PUBLICATIONS

Supplementary European Search Report—EP20950701—Search Authority—The Hague—May 16, 2024.
Intel Corporation: "Discussion on D2D Multicarrier Capabilities", 3GPP TSG RAN WG1 Meeting #77, R1-142316, May 10, 2014 (May 10, 2014), 4 Pages, the whole document.
International Search Report and Written Opinion—PCT/CN2020/111652—ISA/EPO—May 27, 2021.

\* cited by examiner

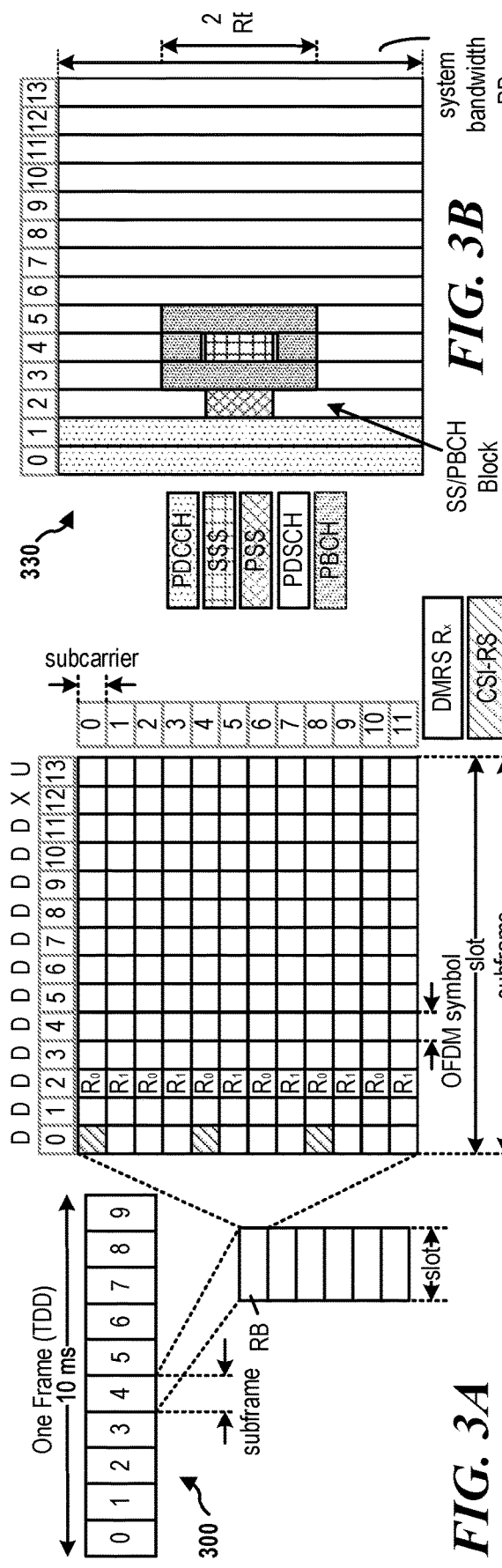
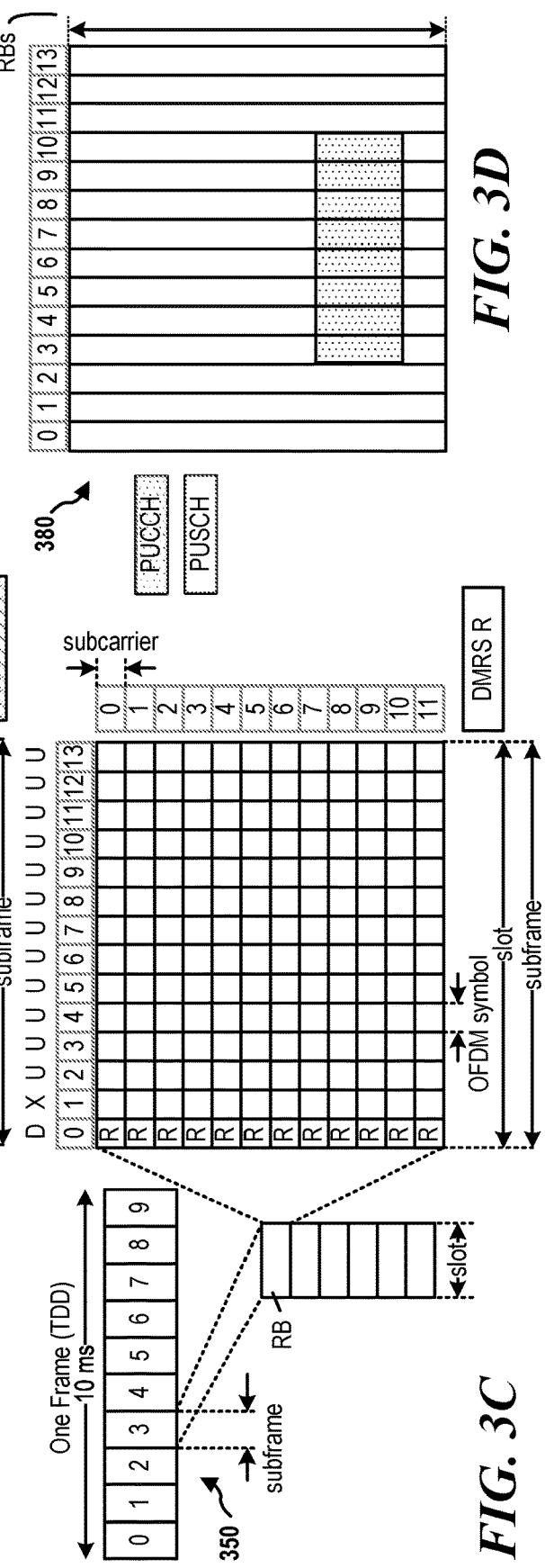

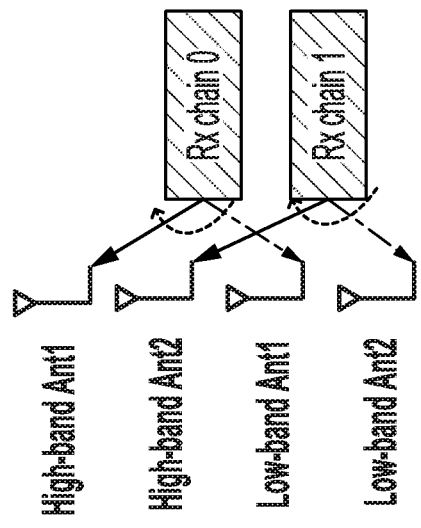
FIG. 4A
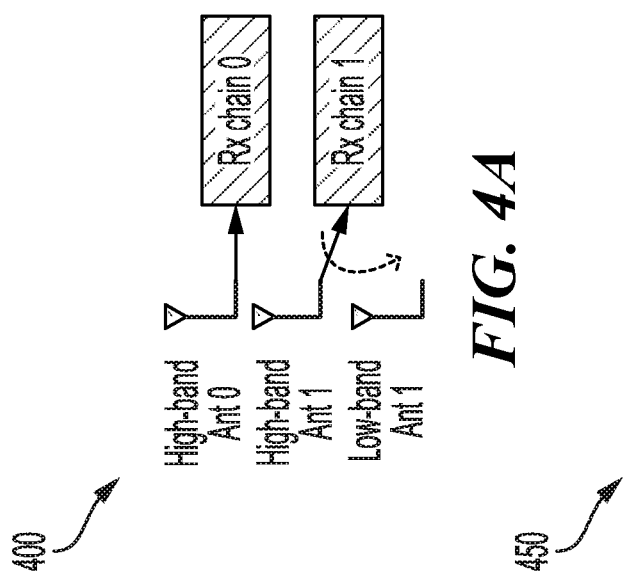
FIG. 4B
FIG. 4C

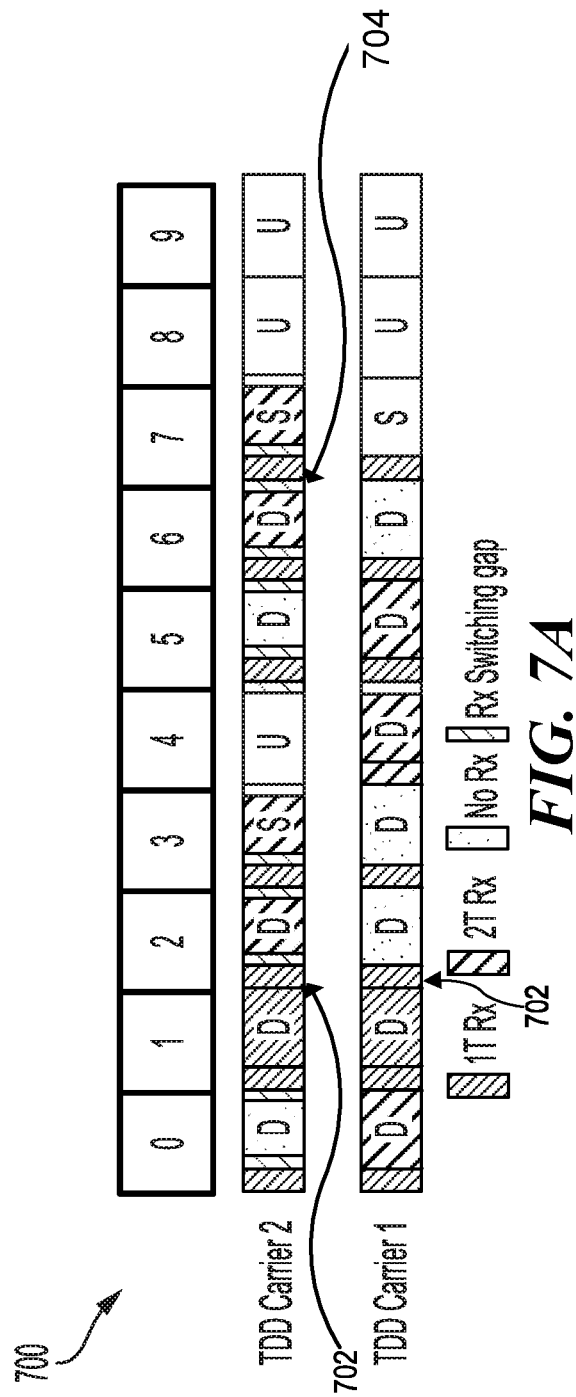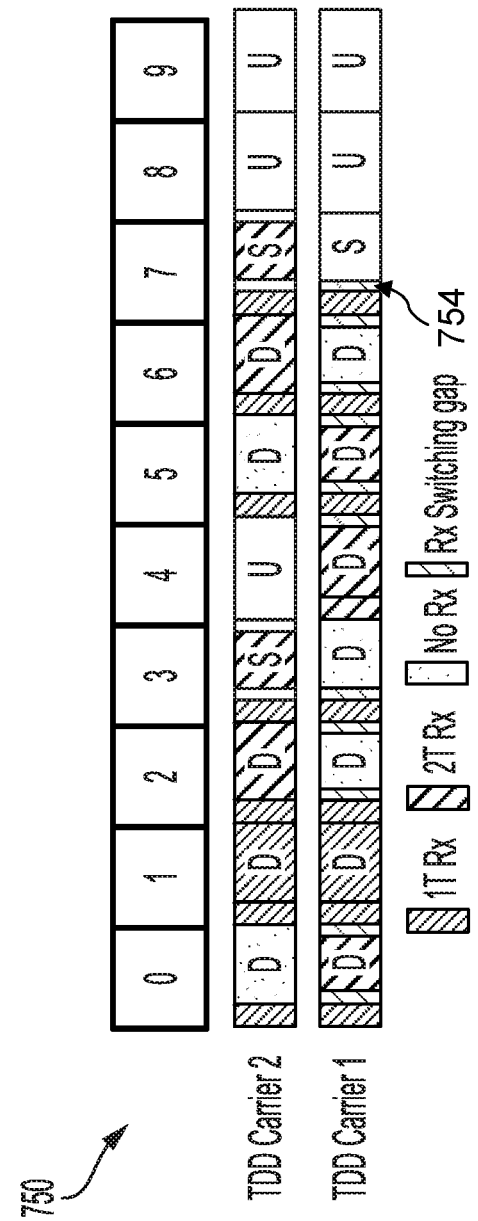
FIG. 7A
FIG. 7B

SWITCHING PERIOD SYMBOL LOCATION FOR RECEIVER SWITCHING

FIELD OF THE DISCLOSURE

Aspects of the present disclosure generally relate to wireless communications, and more particularly to techniques and apparatuses for 5G new radio (NR) switching period symbol location for receiver (Rx) switching.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

A UE may support high rank transmission (e.g., a larger number of receive chains) at higher bands because additional resources are available. A UE may support low or high rank transmissions (e.g., fewer or larger number of receive chains, such as one or two receive chains) at low-band because, for example, there are fewer resources available and low-band is beneficial for cell-edge UEs. Additionally, for UEs with reduced capability (which may be referred to as "RedCap UEs"), there may be only two receive chains and three or four antennas. For instance, the reduced capacity UE may be configured with one or two receive chains and may be switched between high-band and low-band. Unfortunately, because reduced capability UEs may have fewer or less complex resources, the UE may not simultaneously support two receive chain (2Rx) reception on high-band and one receive chain (1Rx) or 2Rx reception on low-band.

SUMMARY

In an aspect of the present disclosure, a method of wireless communication by a user equipment (UE) is provided. The method includes receiving, from a base station, a receive chain switching configuration for a multi-carrier environment. The method also includes receiving a physical downlink control channel (PDCCH) on one or more carriers of the multi-carrier environment with multiple receive chains, in accordance with the receive chain switching configuration. Additionally, the method includes decoding, from the PDCCH, downlink control information (DCI) for physical downlink shared channel (PDSCH) scheduling across multiple carriers in the multi-carrier environment. Further, the method includes performing receive chain switching based on the PDSCH scheduling from the decoded DCI and the receive chain switching configuration.

In another aspect of the present disclosure, an apparatus for wireless communication by a user equipment (UE) is provided. The apparatus includes a memory and one or more processors coupled to the memory. The processor(s) are configured to receive, from a base station, a receive chain switching configuration for a multi-carrier environment. The processor(s) are also configured to receive a physical downlink control channel (PDCCH) on one or more carriers of the multi-carrier environment with multiple receive chains, in accordance with the receive chain switching configuration. In addition, the processor(s) are configured to decode, from the PDCCH, downlink control information (DCI) for physical downlink shared channel (PDSCH) scheduling across multiple carriers in the multi-carrier environment. Further, the processor(s) are configured to perform receive chain switching based on the PDSCH scheduling from the decoded DCI and the receive chain switching configuration.

In yet another aspect of the present disclosure, an apparatus for wireless communication by a user equipment (UE) is provided. The apparatus includes means for receiving, from a base station, a receive chain switching configuration for a multi-carrier environment. The apparatus also includes means for receiving a physical downlink control channel (PDCCH) on one or more carriers of the multi-carrier environment with multiple receive chains, in accordance with the receive chain switching configuration. The apparatus additionally includes means for decoding, from the PDCCH, downlink control information (DCI) for physical downlink shared channel (PDSCH) scheduling across multiple carriers in the multi-carrier environment. Furthermore, the apparatus includes means for performing receive chain switching based on the PDSCH scheduling from the decoded DCI and the receive chain switching configuration.

In a further aspect of the present disclosure, a non-transitory computer readable medium is provided. The computer readable medium has encoded thereon program code for wireless communication by a user equipment (UE). The program code is executed by the UE and includes code to receive, from a base station, a receive chain switching configuration for a multi-carrier environment. The program code also includes code to receive a physical downlink control channel (PDCCH) on one or more carriers of the multi-carrier environment with multiple receive chains, in accordance with the receive chain switching configuration. The program code additionally includes code to decode, from the PDCCH, downlink control information (DCI) for physical downlink shared channel (PDSCH) scheduling across multiple carriers in the multi-carrier environment. Furthermore, the program code includes code to perform receive chain switching based on the PDSCH scheduling from the decoded DCI and the receive chain switching configuration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIGS. 3A, 3B, 3C, and 3D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIGS. 4A and 4B are diagrams illustrating example receive chain configurations of a user equipment (UE), in accordance with aspects of the present disclosure.

FIG. 4C is a table listing example configurations for time division multiplexed (TDM) downlink (DL) carrier aggregation (CA) in accordance with aspects of the present disclosure.

FIGS. 7A and 7B are diagrams illustrating self-carrier scheduling examples, in accordance with aspects of the present disclosure.

DETAILED DESCRIPTION

Figure 1:
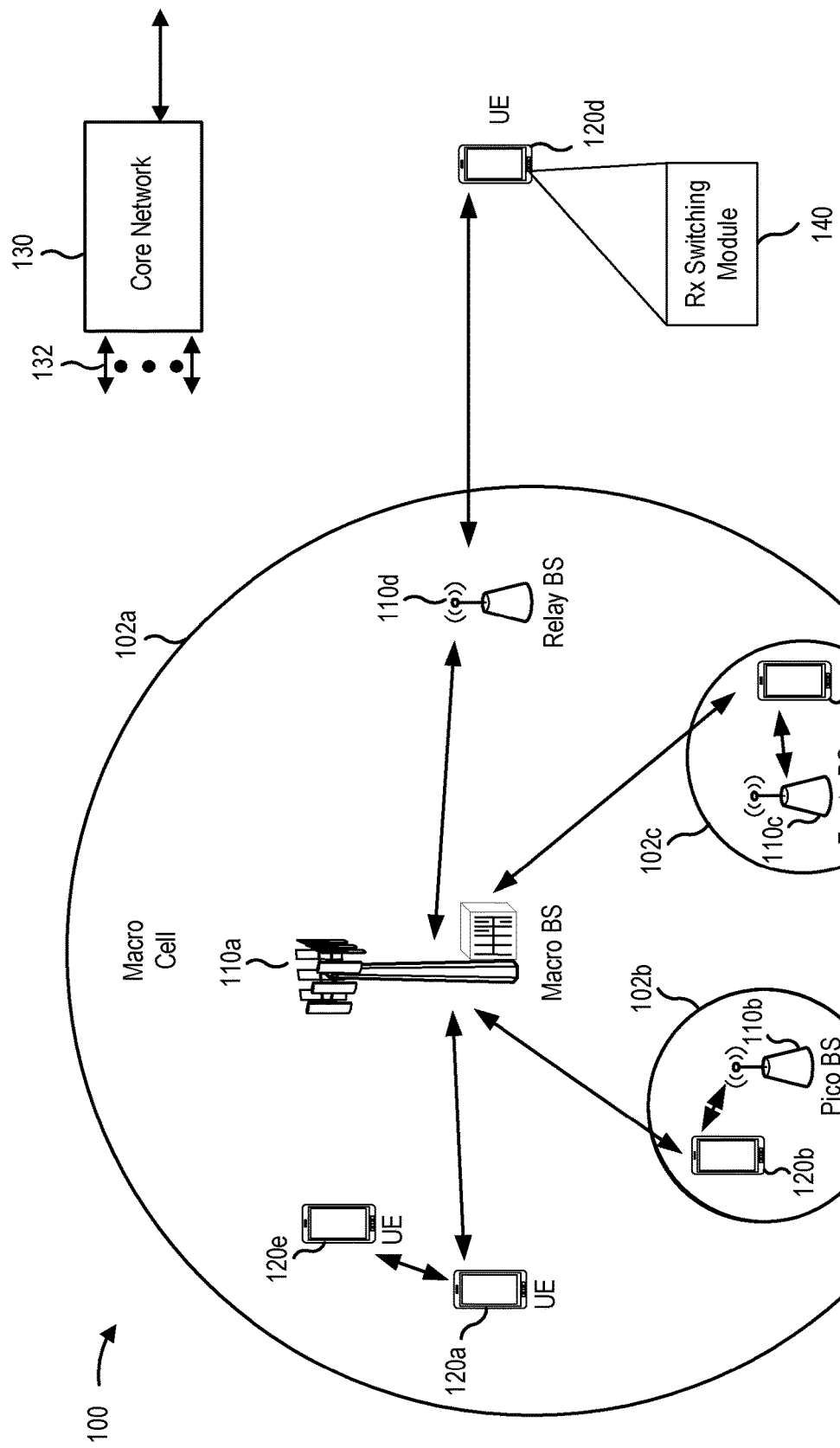
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A UE may be configured to support high rank transmission (e.g., a larger number of receive chains) at higher bands because additional resources are available. A UE may support low or high rank transmissions (e.g., fewer or larger number of receive chains, such as one or two receive chains) at low-band because, for example, there are fewer resources available and low-band is beneficial for cell-edge UEs. Additionally, some UEs may have reduced capability. These reduced capacity UEs (which may be referred to as "RedCap UEs") may be characterized by lower complexity and reduced energy consumption compared to other UEs. The reduced capacity UEs may include NR-Light UEs and Internet of Things (IoT) devices. In one example, a UE with reduced capability may be configured with only two receive chains and three or four antennas. For instance, the reduced capacity UE may be configured with one or two receive chains and may be switched between high-band and low-band. Unfortunately, because reduced capability UEs may have fewer or less complex resources, the UE may not simultaneously support two receive chain (2Rx) reception on high-band and one receive chain (1Rx) or 2Rx reception on low-band.

Aspects of the present disclosure are directed to a switching period location for scheduling reception of a physical downlink shared channel (PDSCH) across multiple component carriers in a carrier aggregation environment. In some aspects, the switching period or location may be configured for receiving a physical downlink control channel (PDCCH) on multiple carriers simultaneously for decoding downlink control information (DCI) for PDSCH scheduling across multiple carriers. The DCI provides a UE with information, such as physical layer resource allocation, power control commands, and other control information.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TR", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a receive (Rx) switching module 140. For brevity, only one UE 120d is shown as including the Rx switching module 140. The Rx switching module 140 may receive, from a base station, a receive chain switching configuration for a multi-carrier environment. The Rx switching module 14 may also receive a physical downlink control channel (PDCCH) on at least one carrier of the multi-carrier environment with multiple receive chains, in accordance with the receive chain switching configuration. Additionally, the Rx switching module 140 may decode, from the PDCCH, downlink control information (DCI) for physical downlink shared channel (PDSCH) scheduling across multiple carriers in the multi-carrier environment. Furthermore, the Rx switching module 140 may perform receive chain switching based at least in part on the PDSCH scheduling from the decoded DCI and the receive chain switching configuration.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
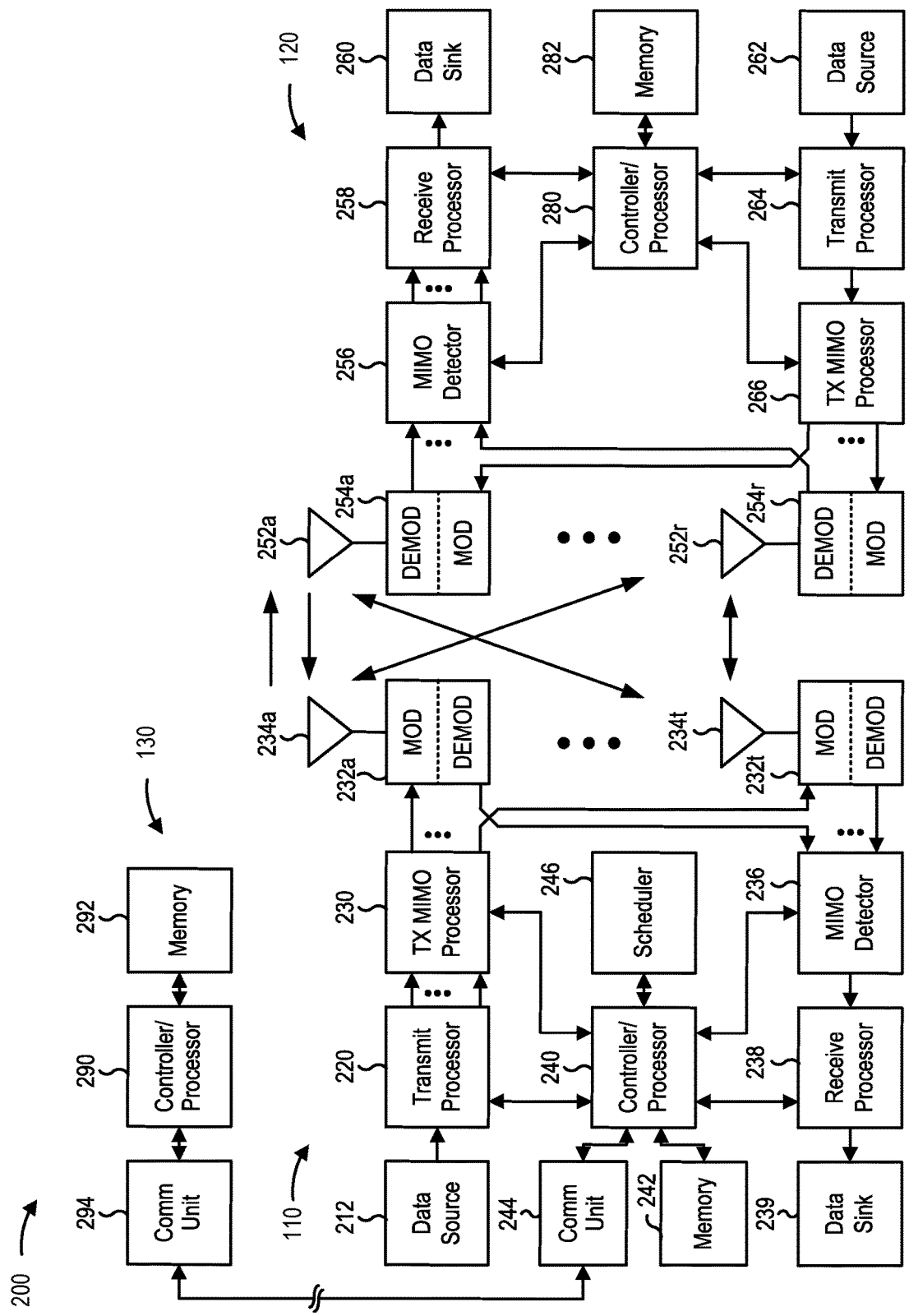
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor of the UE 120, and/or any other component(s) of FIG. 2 may perform one or more techniques associated with a switching period symbol location for receiver (Rx) switching, as described in more detail elsewhere. For example, the controller/processor 280 of the UE 120, and/or any other component(s) of FIG. 2 may perform or direct operations of, for example, the process of FIG. 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, from a base station, a receive chain switching configuration for a multi-carrier environment. The UE 120 may also include means receiving a physical downlink control channel (PDCCH) on at least one carrier of the multi-carrier environment with multiple receive chains, in accordance with the receive chain switching configuration. The UE 120 may additionally include means for decoding, from the PDCCH, downlink control information (DCI) for physical downlink shared channel (PDSCH) scheduling across multiple carriers in the multi-carrier environment. Furthermore, the UE 120 may include means for performing receive chain switching based on the PDSCH scheduling from the decoded DCI and the receive chain switching configuration. Such means may include one or more components of the UE 120 described in connection with FIG. 2.

As indicated above, FIG. 2 is provided merely as an example. Other examples may differ from what is described with regard to FIG. 2.

FIG. 3 is a diagram 300 illustrating an example of a first subframe within a 5G NR frame structure. FIG. 3B is a diagram 230 illustrating an example of DL channels within a 5G NR subframe. FIG. 3C is a diagram 250 illustrating an example of a second subframe within a 5G NR frame structure. FIG. 3D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The sub-carrier spacing and symbol length/duration are a function of the numerology. The subcarrier spacing may be equal to $2^\mu*15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=0$ with 1 slot per subframe. The subcarrier spacing is 15 kHz and symbol duration is approximately 66.7 s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment/negative acknowledgment (ACK/NACK) feedback. The PUSCH carries data, and may additionally be used to carry a buffer status report (BSR), a power headroom report (PHR), and/or UCI.

FIGS. 4A and 4B are diagrams illustrating example receive chain configurations of a user equipment (UE), in accordance with aspects of the present disclosure. Referring to FIG. 4A, a UE 400 includes two receive (Rx) chains (e.g., Rx chain 0 and Rx chain 1) and three antennas (e.g., high-band Ant 0, high-band Ant 1, and low-band Ant 1). Rx chain 0 uses high-band antenna Ant 0. On the other hand, Rx chain 1 may be switched between low-band or high-band communication on low-band Ant 1 or high-band Ant 1, respectively.

Referring to FIG. 4B, a UE 420 includes two receive chains (e.g., Rx chain 0 and Rx chain 1) and four antennas (e.g., high-band Ant 1, high-band Ant 2, low-band Ant 1, and low-band Ant 2). In the UE 420, each of the Rx chains may be switched between high-band or low-band communication. For instance, the Rx chain 0 may be switched between a high-band antenna (e.g., high-band Ant 1) and a low-band antenna e.g., (low-band Ant 1). Likewise, the Rx chain 1 may be switched between a high-band antenna (e.g., high-band Ant 2) and a low-band antenna (e.g., low-band Ant 2).

The transmission on high-band or low-band for the UE 400 and UE 420 may be semi-static (e.g., periodic) or dynamic based on scheduling via a base station (e.g., a gNB) across two carriers (e.g., supplementary downlink (SDL), carrier aggregation (CA), evolved-universal mobile telecommunications service (UMTS) terrestrial radio access network (E-UTRAN) new radio dual connectivity (EN-DC)). The carriers may both be time division duplex (TDD) carriers or may be one TDD carrier and one frequency division duplex (FDD) carrier, for example.

Accordingly, in an aspect of the present disclosure, a receive switching pattern and a carrier switching period configuration is disclosed. The receive switching pattern and carrier switching period may be configured by radio resource control (RRC) signaling or a medium access control-control element (MAC-CE) by the base station (e.g., gNB). In some aspects, the receive switching pattern may include two receive chains configured for receiving for physical downlink control channel (PDCCH) on one carrier for decoding downlink control information (DCI) for physical downlink shared channel (PDSCH) scheduling across two carriers.

FIG. 4C is a table 450 listing example configurations for time division multiplexed (TDM) downlink (DL) carrier aggregation (CA). Referring to FIG. 4C, three example cases are shown for DL CA in the table 450. For TDD+FDD CA (on a first component carrier (CC1)) in case 1, a IE may receive up to two layers at a TDD carrier. In case 2, the UE may receive one layer at an FDD carrier. For TDD+TDD (on a second component carrier (CC2)), there are three example cases shown. In case 1, the UE may receive up to a two-layer transmission on a first TDD carrier. In case 2, the UE may receive up to a two-layer transmission on a second TDD carrier. In case 3, the UE receives a one-layer transmission from the first TDD carrier and a one-layer transmission from the second TDD carrier. Accordingly, the UE only needs two receive chains and can switch receive chains across two bands to support TDM downlink carrier aggregation.

In accordance with aspects of the present disclosure, receive switching patterns or schemes may be defined. In some aspects, the receive switching pattern may include a cross-carrier scheduling pattern. In cross-carrier scheduling, two receive layers for PDCCH may be received on one carrier for decoding DCI for PDSCH scheduling across two carriers.

In some aspects, the receive switching pattern may include a self-carrier scheduling pattern. In the self-carrier scheduling pattern, two carriers each receive a PDCCH. In some aspects, the carriers may receive the PDCCH simultaneously. As such, one receive layer for PDCCH may be received on both carriers for decoding the DCI for PDSCH scheduling across two carriers.

Figures 5A, 5B:
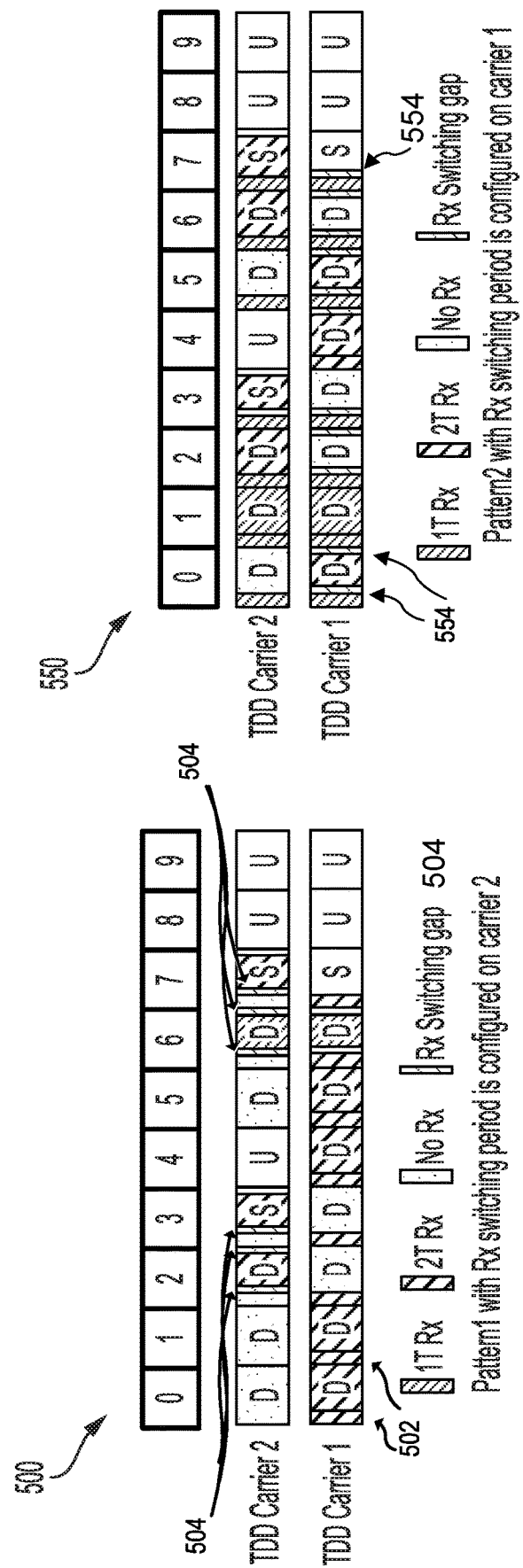
FIG. 5A, is a diagram illustrating an example of cross-carrier scheduling, in accordance with aspects of the present disclosure.
FIG. 5B is a diagram illustrating an example of self-carrier scheduling, in accordance with aspects of the present disclosure.

FIG. 5A is an example diagram 500 illustrating cross-carrier scheduling, in accordance with aspects of the present disclosure. As shown in FIG. 5A, a TDD carrier 1 receives a PDCCH with two receive antennas for scheduling a PDSCH across both the TDD carrier 1 and a TDD carrier 2.

In time slots 0 and 1, the TDD carrier 1 receives the PDCCH (502) for scheduling the PDSCH on carrier 1 while the TDD carrier 2 receives no PDSCH. Because the scheduling is only on TDD carrier 1, no receive switching is performed in time slot 0 and time slot 1, so a switching period is not configured and two receive chains are placed on the TDD carrier 1. In time slot 2, the UE also receives PDCCH on the TDD carrier 1 but the PDCCH scheduling of PDSCH reception is on the TDD carrier 2. Thus, the UE switches the receive chain from TDD carrier 1 to TDD carrier 2. To allow sufficient time for the carrier switch, a switching gap or period 504 may be inserted such that the PDSCH is scheduled to be received on TDD carrier 2 following the switching period 504. After receiving the PDSCH in time slot 2, the UE switches the receive chain from TDD carrier 2 to the TDD carrier 1 to receive the next PDCCH (in time slot 3). To allow sufficient time for the carrier switch (e.g., from the TDD carrier 2 to the TDD carrier 1) a switching gap or period 504 is also configured following the PDSCH reception in time slot 2.

In time slot 3, the UE receives the PDCCH on the TDD carrier 1 with the scheduling of the PDSCH receive on TDD carrier 2 in a special (S) slot. The UE switches the two receive chains from TDD carrier 1 to TDD carrier 2. A switching gap or period 504 may be inserted prior to the PDSCH reception to accommodate the switch. However, because the special (S) slot includes guard symbols at the conclusion of the downlink receive period during which a transmission is not received, the UE may switch the two receive chains to TDD carrier 1 without the inclusion of a switching period and the symbols for downlink transmission on TDD carrier 1 may be read (e.g., time slot 4).

In time slot 6, TDD carrier 1 again receives PDCCH. However, in time slot 6, the scheduling is for the UE to receive the PDSCH on both TDD carrier 1 and TDD carrier 2. That is, one layer may be received on each carrier. As such, the UE switches one receive chain from TDD carrier 1 to TDD carrier 2. To allow sufficient time for the carrier switch (TDD carrier 1 to TDD carrier 2), a switching gap or period 504 is also configured to precede the PDSCH reception on TDD carrier 2 in time slot 6. After receiving the PDSCH in time slot 6, the UE switches the receive chain from TDD carrier 2 to the TDD carrier 1 to receive the next PDCCH (time slot 7). Thus, another switching gap 504 is present. Similarly, a switching gap 504 is provided prior to switching in slot 7 for downlink reception during the special slot (S).

FIG. 5B is a diagram illustrating an example of self-carrier scheduling in accordance with aspects of the present disclosure. Referring to FIG. 5B, in time slot 0, the UE receives PDCCH on both carriers (e.g., TDD carrier 1 and TDD carrier 2), simultaneously with one receive chain on TDD carrier 1 and one receive chain on TDD carrier 2. In time slot 0, the PDSCH is only scheduled on TDD carrier 1. The UE switches one receive chain from TDD carrier 2 to TDD carrier 1 to receive a two-layer PDSCH on TDD carrier 1. To accommodate the switching of the receive chain, a switching period 554 may be included prior to and following PDSCH reception. In time slot 1, the UE again receives the PDCCH on both carriers, however, the UE receives a one-layer PDSCH on TDD carrier 1 and a one-layer PDSCH on the TDD carrier 2. Because a receive switch is not performed for the PDSCH reception in slot 1, a switching gap or period is not configured.

In time slot 2, the UE receives the PDCCH on both carriers, for PDSCH scheduled on TDD carrier 2 only. The UE switches one receive chain from TDD carrier 1 to the TDD carrier 2 to receive a two-layer PDSCH on TDD carrier 2.

The location of the switching period symbols may be semi-statically configured by radio resource control (RRC) signaling on one specified carrier of the two downlink carriers. In cross-carrier scheduling, for downlink slots, a carrier switching period is not present for every downlink receive period, for instance, if the downlink slot on one carrier overlaps an uplink slot on the other carrier.

Although FIGS. 5A and 5B refer to TDD configurations, FDD configurations are also contemplated. In this case, all slots are treated as downlink slots. That is, only downlink carriers are considered.

Figure 6A:
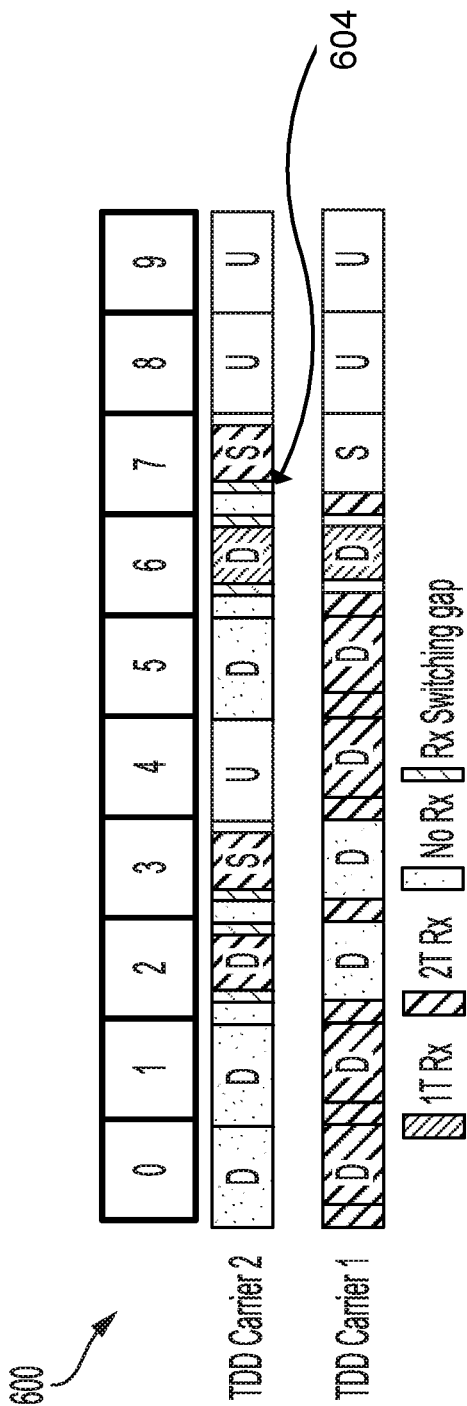
FIGS. 6A and 6B are diagrams illustrating cross-carrier scheduling examples, in accordance with aspects of the present disclosure.
Figure 6B:
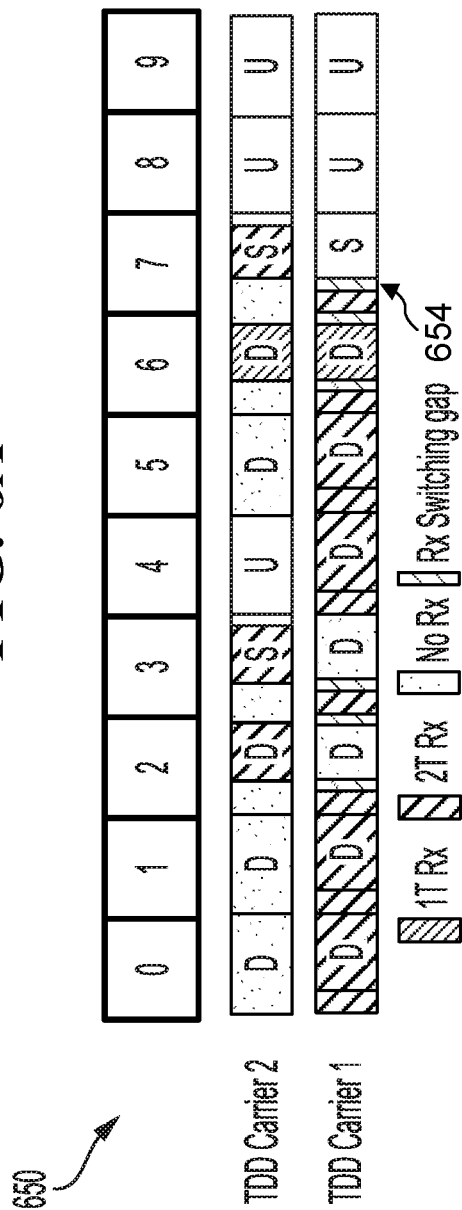

FIGS. 6A and 6B are diagrams 600 and 650, respectively, illustrating cross-carrier scheduling examples, in accordance with aspects of the present disclosure. In FIG. 6A, the frequency location of the switching periods is semi-statically configured by RRC signaling on TDD carrier 2. In time slot 4, a downlink slot of a TDD carrier 1 overlaps an uplink slot of the TDD carrier 2, so a carrier switch period is not configured.

On the other hand, if a switching period is present, the switching period is placed on the first one or more downlink symbols and the last one or more downlink symbols of a downlink receive period. For example, as shown in FIG. 6A, in time slot 2, a UE operating with a cross-scheduling configuration receives a PDCCH on TDD carrier 1 scheduling two-layer PDSCH reception on TDD carrier 2. As such, the UE switches two receive chains to TDD carrier 2. To accommodate the receive switch, a switching period 604 is placed on the first one or more downlink symbols and the last one or more downlink symbols of the downlink receive period of time slot 2 of TDD carrier 2.

For special slots with the cross-scheduling, a switching period is only placed on the first one or more downlink symbols of the downlink receive period. For instance, referring again to FIG. 6A, in time slot 3 for TDD carrier 2, a switching period 604 is placed only on the first one or more downlink symbols of the downlink receive period. The switch gap 604 is not included in the last one or more symbols because the special slot includes a gap period and uplink symbols at the end of the special slot, during which the receive chain can switch.

Referring to FIG. 6B, the frequency location of the switching periods is semi-statically configured by RRC signaling on TDD carrier 1. For instance, in time slot 2, a UE operating using a cross-scheduling scheme, receives a PDCCH on the TDD carrier 1 for a two-layer PDSCH reception on a TDD carrier 2. As such, the UE switches two receive chains to TDD carrier 2. To accommodate the receive switch, a switching period 654 is placed on the first one or more downlink symbols and the last one or more downlink symbols of the downlink receive period of time slot 2 of TDD carrier 1.

FIGS. 7A and 7B are diagrams 700, and 750, respectively, illustrating self-carrier scheduling examples, in accordance with aspects of the present disclosure. In FIG. 7A, the frequency location of the switching periods is semi-statically configured by RRC signaling on TDD carrier 2, and in FIG. 7B, the frequency location of the switching period is semi-statically configured by RRC signaling on TDD carrier 1. That is, the frequency location of the switching periods is semi-statically configured on one specific carrier of the two downlink carriers.

In self-scheduling for downlink slots, a carrier switching period is not present for every downlink receive period, for example, if a UE is scheduled to receive a rank 1 PDSCH on both carriers simultaneously. This is shown, for instance, in FIGS. 7A and 7B at time slot 1. In time slot 1, a UE is scheduled to receive a one-layer PDSCH on TDD carrier 1 and TDD carrier 2, simultaneously. As such, a switching period is not configured for time slot 1 because one receive chain is already assigned to each TDD carrier.

If, however, the switching period is present, the switching period may be placed on the first one or more downlink symbols and the last one or more downlink symbols of a downlink receive period. For instance, referring to FIG. 7A, in time slot 2, the UE receives a PDCCH (702) on TDD carrier 1 and TDD carrier 2 for a two-layer PDSCH reception on the TDD carrier 2. As such, the RRC configuration may include a switching period 704 on TDD carrier 2 for the first one or more downlink symbols and the last one or more downlink symbols of a downlink receive period of time slot 2.

In some implementations, the switching period 704 is placed on only the last one or more downlink symbols of a downlink receive period if the downlink on one carrier overlaps an uplink slot on the other carrier. For instance, referring to FIG. 7A, in time slot 4, a downlink slot of TDD carrier 1 overlaps an UL slot of TDD carrier 2. Accordingly, with the switching periods configured for TDD carrier 2, the switching period 704 is placed only on the last one or more downlink symbols of the downlink receive period of TDD carrier 2. Similarly, referring to FIG. 7B, in time slot 4, with the switching periods configured for TDD carrier 1, a switching period 754 is placed only on the last one or more downlink symbol of the downlink receive period of TDD carrier 1.

Additionally, in some implementations, for a special slot in the self-scheduling scheme, a switching period is only placed on the first one or more downlink symbols of a downlink receive period. For example, referring to FIG. 7A, in time slot 3, the TDD carrier 2 has a special (S) slot in time slots 3 and 7. The switching period 704 is included only on the first one or more downlink symbols of the receive period.

The number of symbols included in the switching period to accommodate the receive switch from one carrier to the other is determined based on the UE capabilities. For instance, the switching period may be based on the number of antennas, UE bandwidth, or other measures of UE capabilities.

Figure 8:
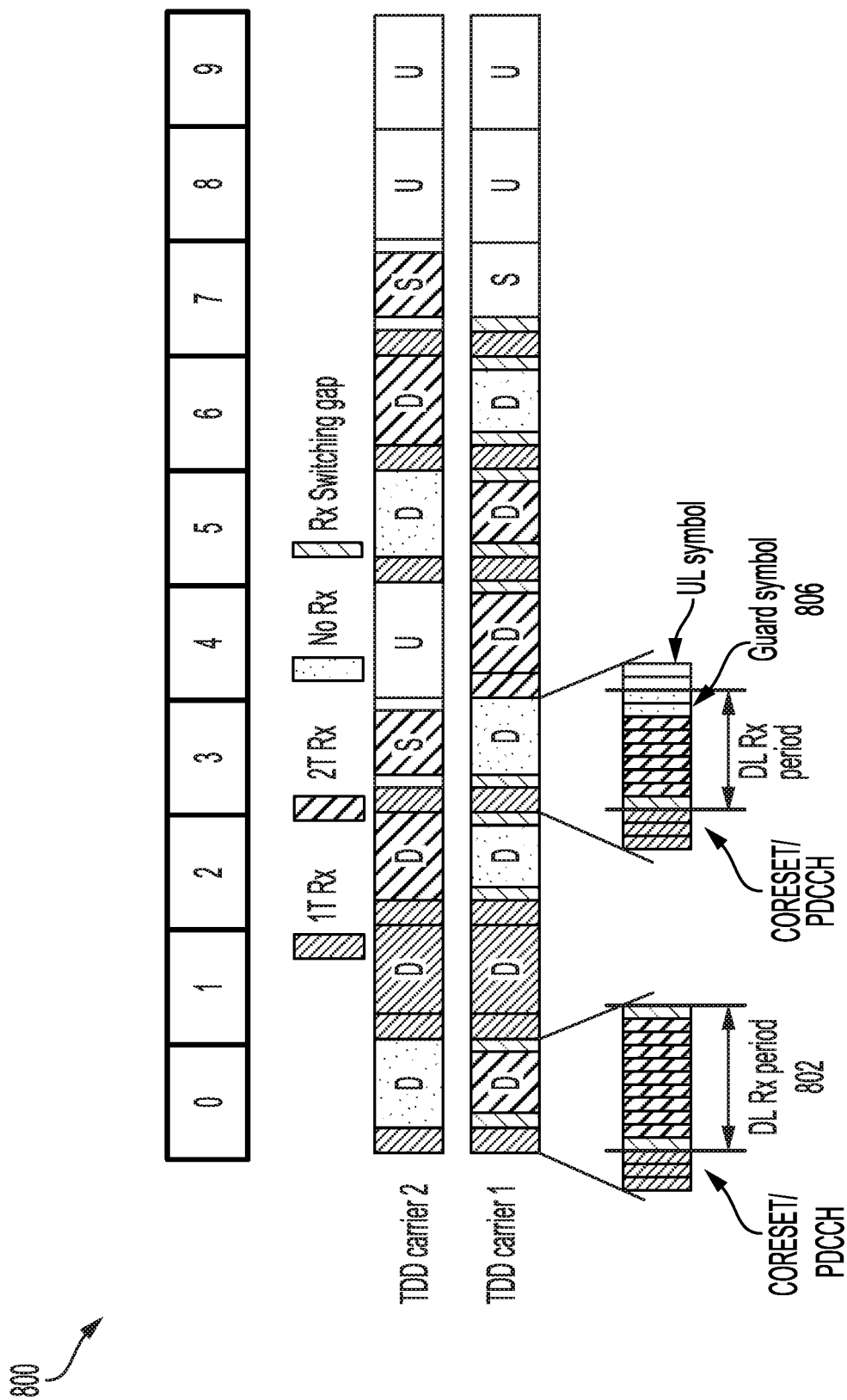
FIG. 8 is a diagram illustrating a downlink receive period, in accordance with aspect of the present disclosure.

FIG. 8 is a diagram 800 illustrating a downlink receive period 802, in accordance with aspect of the present disclosure. The downlink receive period 802 starts from a symbol, which is immediately subsequent to a control resource set (CORESET)/PDCCH symbol 804, and extends to the last downlink symbol of a downlink slot or to a last guard symbol 806 of a special (S) slot (see time slot 3) on the configured carrier.

As indicated above, FIGS. 4-8 are provided as examples. Other examples may differ from what is described with respect to FIGS. 4-8.

Figure 9:
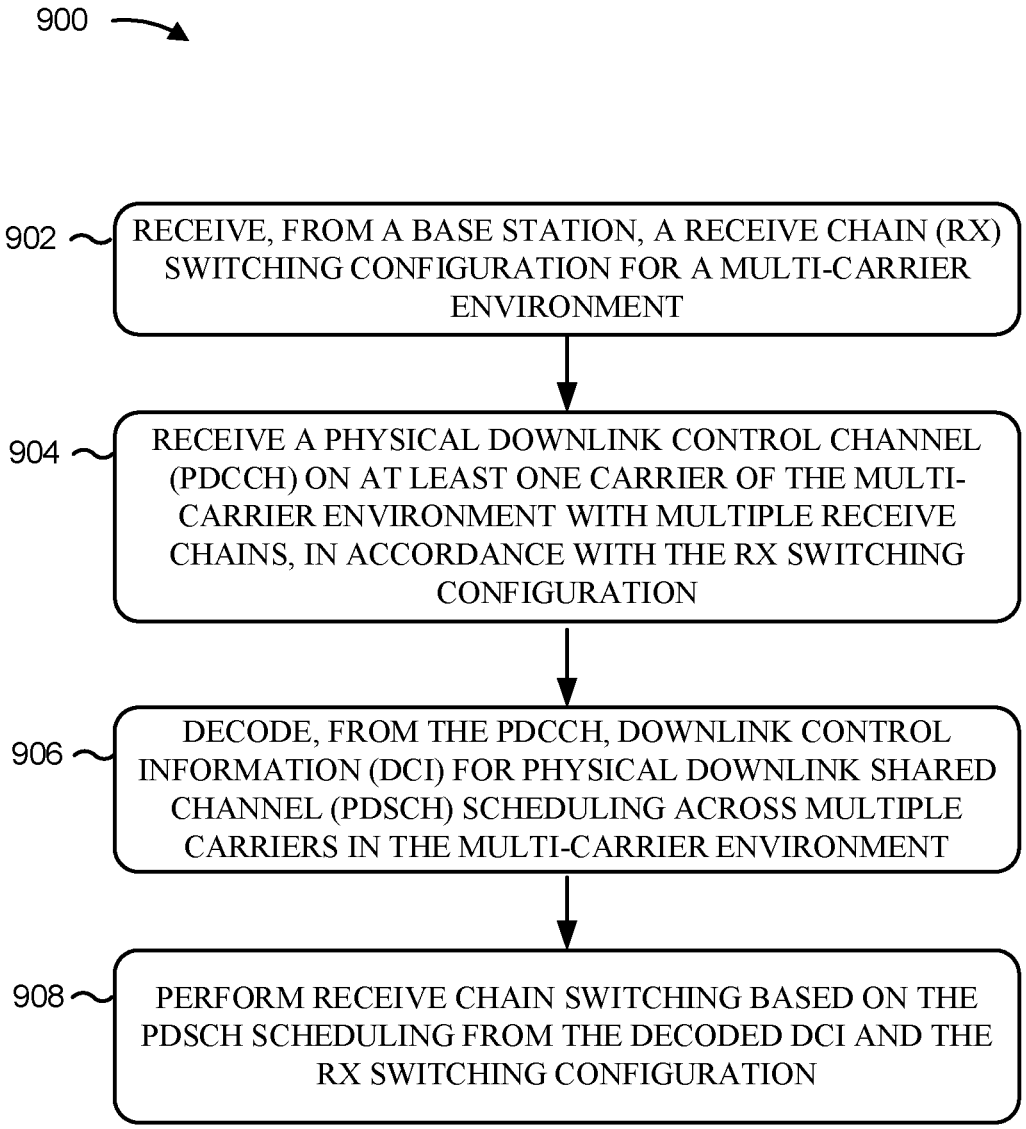
FIG. 9 is a diagram illustrating an example process performed, for example, by a user equipment (UE), in accordance with various aspects of the present disclosure.

FIG. 9 is a diagram illustrating an example process 900 performed, for example, by a user equipment (UE), in accordance with various aspects of the present disclosure. The UE may, for instance, be a reduced capability UE such as an NR-light or an Internet of Things (IoT) device. In block 902, the process 900 receives, from a base station, a receive (Rx) chain switching configuration for a multi-carrier environment. For example, Rx switching gaps may be configured as shown in FIGS. 5A-8.

In block 904, the process 900 receives a physical downlink control channel (PDCCH) on one or more carriers of the multi-carrier environment with multiple receive chains, in accordance with the receive chain switching configuration. For instance, as shown in FIG. 5A, in time slots 0 and 1, the TDD carrier 1 receives the PDCCH (502) for scheduling a PDSCH on TDD carrier 1, in accordance with a cross scheduling Rx switching configuration. In some aspects, the process may receive the PDCCH on multiple carriers simultaneously, with one receive chain assigned to each carrier. For instance, as discussed with reference to FIG. 5B, in time slot 0, the UE receives the PDCCH on both carriers (e.g., TDD carrier 1 and TDD carrier 2), simultaneously with one receive chain on TDD carrier 1 and one receive chain on TDD carrier 2.

In block 906, the process decodes, from the PDCCH, downlink control information (DCI) for physical downlink shared channel (PDSCH) scheduling across multiple carriers in the multi-carrier environment. As shown in FIG. 5A, TDD carrier 1 receives the PDCCH with two Rx antennas for scheduling the PDSCH across both TDD carrier 1 and TDD carrier 2. As shown in FIG. 5B at slot 0, TDD carrier 1 and TDD carrier 2 each receive the PDCCH with one Rx antenna for scheduling the PDSCH in TDD carrier 1.

In block 908, the process performs receive chain switching based at least in part on the PDSCH scheduling from the decoded DCI and the Rx switching configuration. In some aspects, the receive chain switching may include switching one or more of the receive chains to a second carrier during a switching period if a downlink slot of the first carrier overlaps with a downlink slot of the second carrier. As shown for example in FIG. 8, a switching period may include a first one or more symbols of a downlink reception period of a configured carrier and a last one or more symbols of the downlink reception period of the configured carrier.

Additionally, in some aspects, multiple receive chains may be maintained on current carriers when a downlink reception period of the first carrier overlaps with an uplink slot of a second carrier. For example, as shown in FIG. 6A in time slot 4, a downlink slot of TDD carrier 1 overlaps an uplink slot of the TDD carrier 2, so a carrier switch period is not configured.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving, from a base station, a receive chain switching configuration for a multi-carrier environment;
   receiving a physical downlink control channel (PDCCH) on at least one carrier of the multi-carrier environment with a plurality of receive chains, in accordance with the receive chain switching configuration;
   decoding, from the PDCCH, downlink control information (DCI) for physical downlink shared channel (PDSCH) scheduling across a plurality of carriers in the multi-carrier environment; and
   performing receive chain switching based at least in part on the PDSCH scheduling from the decoded DCI and the receive chain switching configuration.

2. The method of claim 1, in which the at least one carrier comprises a single carrier.

3. The method of claim 2, in which performing receive chain switching comprises switching at least one of the receive chains to a second carrier during a switching period when a downlink slot of the first carrier overlaps with a downlink slot of the second carrier.

4. The method of claim 3, in which the switching period comprises a first one or more symbols of a downlink reception period of a configured carrier and a last one or more symbols of the downlink reception period of the configured carrier.

5. The method of claim 2, further comprising maintaining the plurality of receive chains on current carriers when a downlink reception period of the first carrier overlaps with an uplink slot of a second carrier.

6. The method of claim 1, in which the at least one carrier comprises the plurality of carriers, the method further comprising receiving the PDCCH on the plurality of carriers simultaneously, with one receive chain assigned to each carrier.

7. The method of claim 6, further comprising switching at least one of the receive chains to a second carrier during a switching period unless rank one PDSCH is scheduled for both carriers simultaneously during a downlink reception period.

8. The method of claim 7, in which the switching period comprises a first one or more symbols of the downlink reception period of a configured carrier and a last one or more symbols of the downlink reception period of the configured carrier when a downlink slot of the first carrier overlaps with a downlink slot of the second carrier.

9. The method of claim 7, in which the switching period comprises a last one or more symbols of a downlink slot of a first carrier when the downlink slot of the first carrier overlaps with an uplink slot of the second carrier.

10. The method of claim 1, further comprising semi-statically receiving a frequency location configuration of a switching period via one carrier of the multi-carrier environment.

11. The method of claim 1, further comprising switching at least one of the receive chains to a second carrier during a switching period when a downlink slot of the first carrier overlaps with a special slot of the second carrier.

12. The method of claim 11, in which the switching period comprises a first one or more symbols of a downlink reception period.

13. The method of claim 1, in which a downlink reception period starts at a first symbol after a CORESET (control resource set) or PDCCH symbol and ends at a last symbol of a downlink slot on a carrier configured by the base station.

14. The method of claim 1, in which a downlink reception period starts at a symbol after a CORESET/PDCCH symbol and ends at a last guard symbol of a special slot on a carrier configured by the base station.

15. An apparatus for wireless communication by a user equipment (UE), comprising:
    a memory; and
    at least one processor coupled to the memory, the at least one processor being configured:
    to receive, from a base station, a receive chain switching configuration for a multi-carrier environment;
    to receive a physical downlink control channel (PDCCH) on at least one carrier of the multi-carrier environment with a plurality of receive chains, in accordance with the receive chain switching configuration;
    to decode, from the PDCCH, downlink control information (DCI) for physical downlink shared channel (PDSCH) scheduling across a plurality of carriers in the multi-carrier environment; and
    to perform receive chain switching based at least in part on the PDSCH scheduling from the decoded DCI and the receive chain switching configuration.

16. The apparatus of claim 15, in which the at least one carrier comprises a single carrier.

17. The apparatus of claim 16, in which the at least one processor is further configured to switch at least one of the receive chains to a second carrier during a switching period when a downlink slot of the first carrier overlaps with a downlink slot of the second carrier.

18. The apparatus of claim 17, in which the switching period comprises a first one or more symbols of a downlink reception period of a configured carrier and a last one or more symbols of the downlink reception period of the configured carrier.

19. The apparatus of claim 16, in which the at least one processor is further configured to maintain the plurality of receive chains on current carriers when a downlink reception period of the first carrier overlaps with an uplink slot of a second carrier.

20. The apparatus of claim 15, in which the at least one carrier comprises the plurality of carriers, and the at least one processor is further configured to receive the PDCCH on the plurality of carriers simultaneously, with one receive chain assigned to each carrier.

21. The apparatus of claim 20, in which the at least one processor is further configured to switch at least one of the receive chains to a second carrier during a switching period unless rank one PDSCH is scheduled for both carriers simultaneously during a downlink reception period.

22. The apparatus of claim 21, in which the switching period comprises a first one or more symbols of the downlink reception period of a configured carrier and a last one or more symbols of the downlink reception period of the configured carrier when a downlink slot of the first carrier overlaps with a downlink slot of the second carrier.

23. The apparatus of claim 21, in which the switching period comprises a last one or more symbols of a downlink slot of a first carrier when the downlink slot of the first carrier overlaps with an uplink slot of the second carrier.

24. The apparatus of claim 15, in which the at least one processor is further configured to semi-statically receive a frequency location configuration of a switching period via one carrier of the multi-carrier environment.

25. The apparatus of claim 15, in which the at least one processor is further configured to switch at least one of the receive chains to a second carrier during a switching period when a downlink slot of the first carrier overlaps with a special slot of the second carrier.

26. The apparatus of claim 25, in which the switching period comprises a first one or more symbols of a downlink reception period.

27. The apparatus of claim 15, in which a downlink reception period starts at a first symbol after a CORESET (control resource set) or PDCCH symbol and ends at a last symbol of a downlink slot on a carrier configured by the base station.

28. The apparatus of claim 15, in which a downlink reception period starts at a symbol after a CORESET/PDCCH symbol and ends at a last guard symbol of a special slot on a carrier configured by the base station.

29. An apparatus for wireless communication by a user equipment (UE), comprising:
    means for receiving, from a base station, a receive chain switching configuration for a multi-carrier environment;
    means for receiving a physical downlink control channel (PDCCH) on at least one carrier of the multi-carrier environment with a plurality of receive chains, in accordance with the receive chain switching configuration;
    means for decoding, from the PDCCH, downlink control information (DCI) for physical downlink shared channel (PDSCH) scheduling across a plurality of carriers in the multi-carrier environment; and
    means for performing receive chain switching based at least in part on the PDSCH scheduling from the decoded DCI and the receive chain switching configuration.

30. The apparatus of claim 29, in which the at least one carrier comprises a single carrier, and the apparatus further comprises means for switching at least one of the receive chains to a second carrier during a switching period when a downlink slot of the first carrier overlaps with a downlink slot of the second carrier.

31. The apparatus of claim 30, in which the switching period comprises a first one or more symbols of a downlink reception period of a configured carrier and a last one or more symbols of the downlink reception period of the configured carrier.

32. The apparatus of claim 30, further comprising means for maintaining the plurality of receive chains on current carriers when a downlink reception period of the first carrier overlaps with an uplink slot of a second carrier.

33. The apparatus of claim 29, in which the at least one carrier comprises the plurality of carriers, and the apparatus further comprises means for receiving the PDCCH on the plurality of carriers simultaneously, with one receive chain assigned to each carrier, and means for switching at least one of the receive chains to a second carrier during a switching period unless rank one PDSCH is scheduled for both carriers simultaneously during a downlink reception period.

34. The apparatus of claim 33, in which the switching period comprises a first one or more symbols of the downlink reception period of a configured carrier and a last one or more symbols of the downlink reception period of the configured carrier when a downlink slot of the first carrier overlaps with a downlink slot of the second carrier.

35. The apparatus of claim 33, in which the switching period comprises a last one or more symbols of a downlink slot of a first carrier when the downlink slot of the first carrier overlaps with an uplink slot of the second carrier.

* * * * *